United States Patent Office

3,285,720
APPARATUS FOR PRODUCING GLASS FIBERS
Warren Wendell Drummond, Allison Park, Pa., assignor to Pittsburgh Plate Glass Company, Pittsburgh, Pa., a corporation of Pennsylvania
Filed July 29, 1963, Ser. No. 298,337
3 Claims. (Cl. 65—1)

This invention relates to a novel apparatus for producing glass fibers.

There are two major processes in use today for producing glass fibers, i.e., the strand process in which continuous filaments are produced, and the superfine process in which primary fibers are attenuated into discontinuous fibers generally collected as a mat or blanket. The strand process produces filaments usable, for example, in fabrics and the like.

In the strand process, batch materials are mixed and fed into a tank where they are melted to provide a continuous supply of molten glass to a forehearth. One or more electrically heated platinum alloy bushings are located in the bottom of the forehearth. Each bushing has a plurality of orifices from which individual glass streams flow and from which filaments are drawn at a high rate of speed.

The diameter of the filament produced is determined primarily by the speed of drawing, size of the bushing orifice and temperature of the bushing. The temperature of the glass at the tips of the bushing orifices is critical in maintaining the continuity of the drawing operation and the diameter of the filament substantially constant. This temperature is controlled by controlling the electrical input to the bushing. Usually, the glass cones flowing from the bushing are also cooled.

The filaments are generally coated with a size during the drawing operation, which size serves to bind the filaments together when collected in strand form and to lubricate the filaments, so as to prevent them from abrading and severing each other. Various types of size applicators and sizes can be employed in the process.

Thereafter, the filaments are grouped into a strand and are wound onto a forming tube. The strand is unwound from the forming tube and fabricated by conventional textile processes into various products.

In the superfine process, batch materials are mixed and fed into a tank where they are melted to provide a continuous supply of molten glass to a forehearth. One or more electrically heated, platinum alloy bushings are located in the bottom of the forehearth. Each bushing has a plurality of orifices from which solid rods of glass, known as primary fibers, are pulled by cot rolls.

The primary fibers are guided and introduced into a hot gaseous blast created by burning a combustible mixture in a burner. The heat of the blast softens the primary fibers and the velocity of the blast attenuates the softened fibers into fine, discontinuous fibers at a high rate of speed.

Usually an oil emulsion is applied to the fibers and a thermosetting resinous binder may or may not be applied to the discontinuous fibers just after they are formed. The fine fibers are collected on a moving conveyor as a mat or blanket which is seat cured and compressed to the desired thickness and density.

The apparatus of the invention to be described is applicable to either of the described processes; however, description will be limited to its application to the strand process where its benefits are greatest. A skilled workman can adopt the inventive process and apparatus to the superfine process in the usual course of his work and without inventive ingenuity.

In the present process, batch material is fed to and melted in a tank to provide a continuous supply of molten glass, as in the two described processes. The molten glass is fed from the melting tank to a container within a refractory enclosure, so that there is established a pool of molten glass. Means are provided to supply heat to the enclosure to maintain the pool of molten glass at the desired temperature. A bushing unit, constructed of a conventional platinum alloy and having orifices for the passage of molten glass is arranged at a level below the level of the pool of molten glass and in the lower wall of the enclosure. Any number of bushings may be used and their positions and spacings can be varied because of the enclosure construction. A siphon tube is connected to the bushing unit at one end and is immersed within the molten glass of the pool at its other end to deliver molten glass from said pool to the bushing unit. Conventional drawing and strand grouping means, such as a grooved guide and a strand winding device are employed when continuous strand product is being produced. A binder or size may be applied to the strand in a conventional manner, if so desired.

As can be readily understood, substantially uniform glass and bushing temperatures can be maintained using the inventive principles described because of the massive heat supplied to the refractory enclosure. The refractory enclosure is a radiant enclosure, wherein nearly black body conditoins are extant, and the temperature of the enclosure interior, glass therein and the bushing units are substantially uniform. The need for costly equipment to electrically heat and control the temperature of the bushings is eliminated.

Other features of the invention will become apparent from the following description taken with the accompanying drawings, in which.

Figure 1:
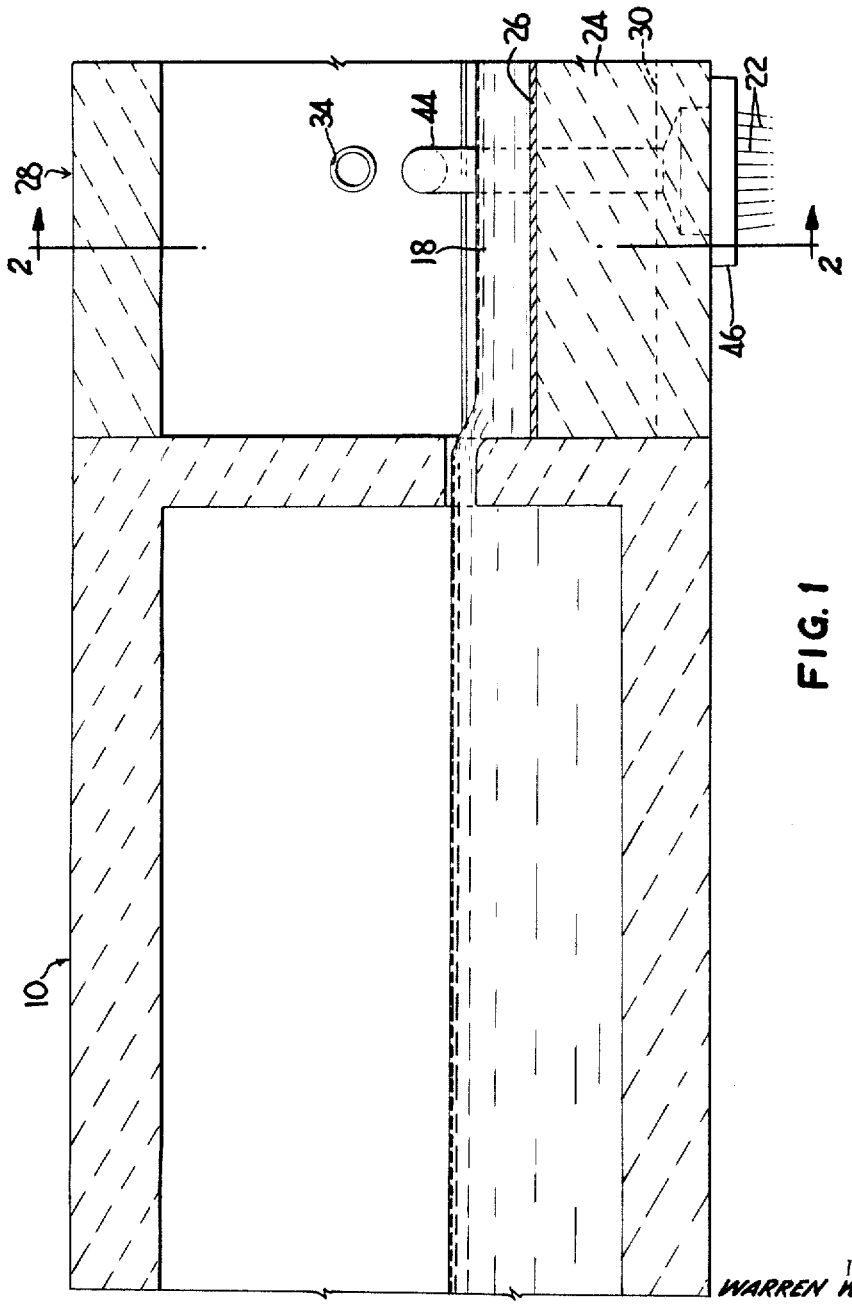
FIG. 1 is an elevational view of apparatus for producing glass fibers according to this invention.
Figure 2:
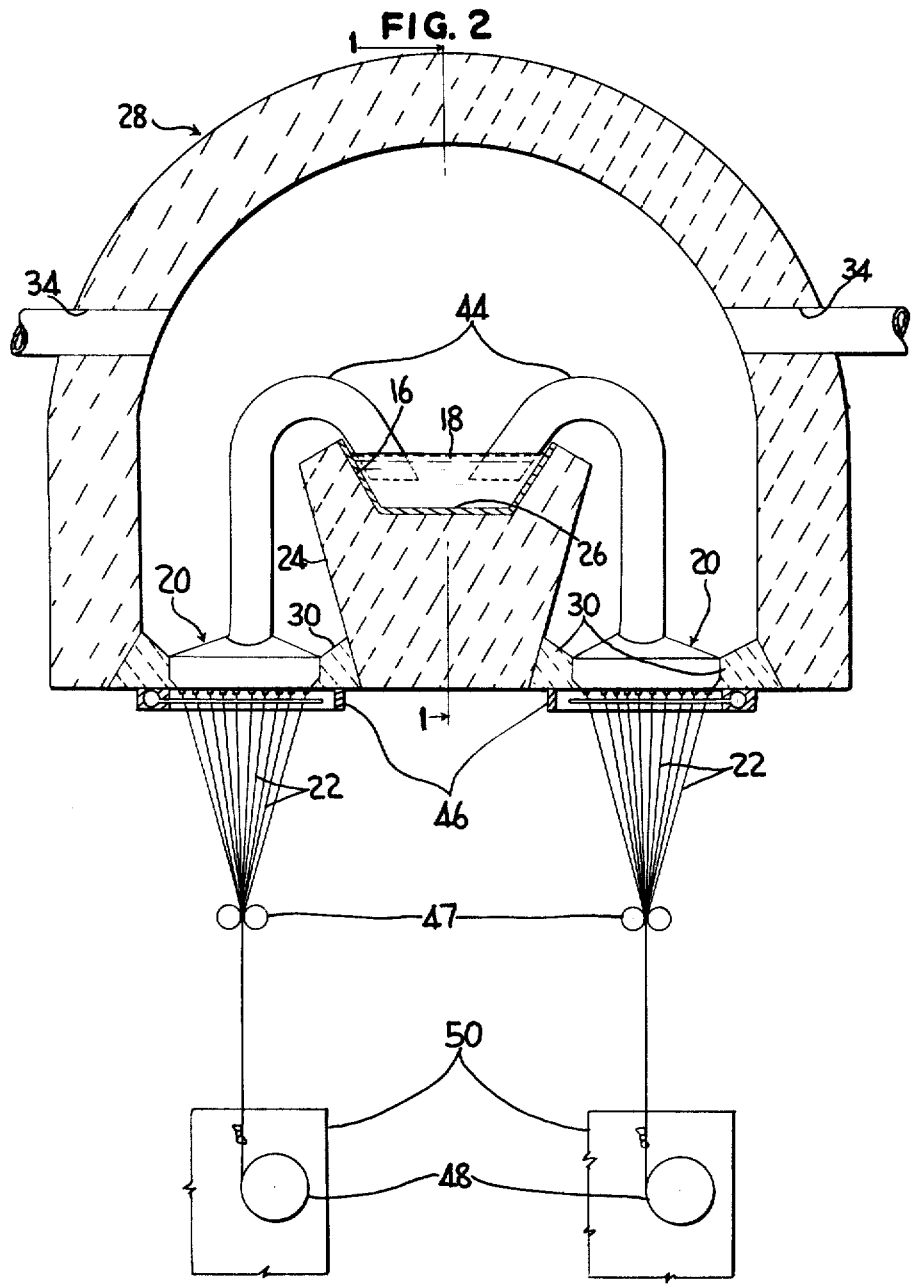
FIG. 2 is a sectional view taken on line 2—2 of FIG. 1, looking in the direction of the arrows.
Figure 3:
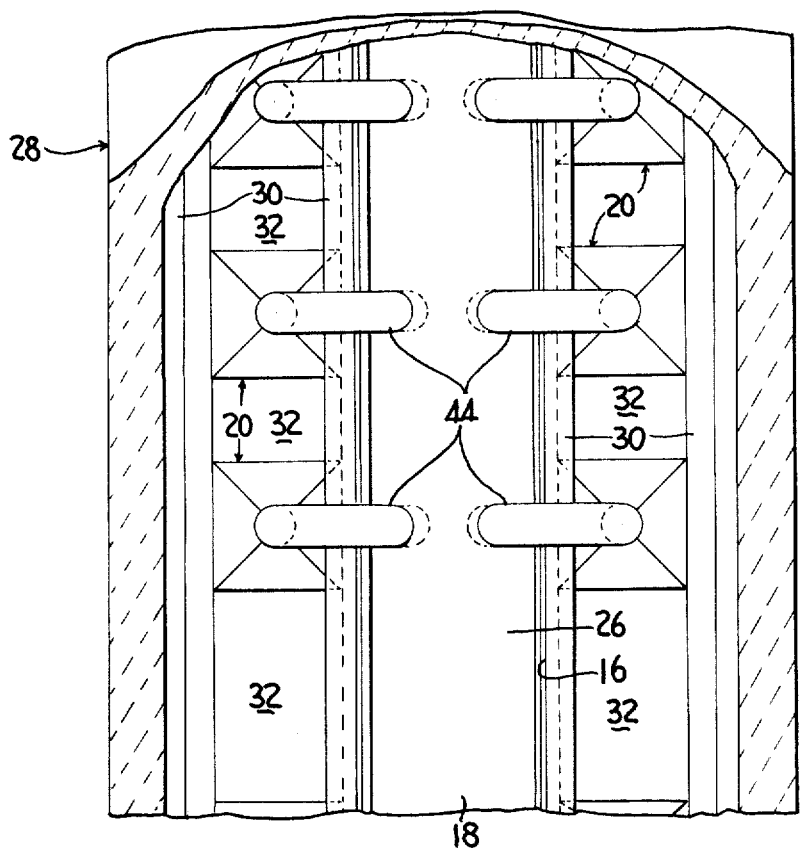
FIG. 3 is a partial plan view of the apparatus of FIG. 1 with parts broken away.
Figure 4:
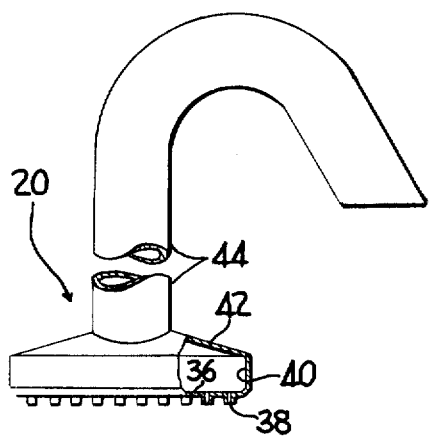
FIG. 4 is an elevational view of the bushing unit usable in the apparatus of FIGS. 1 to 3 with parts broken away.
Figure 5:
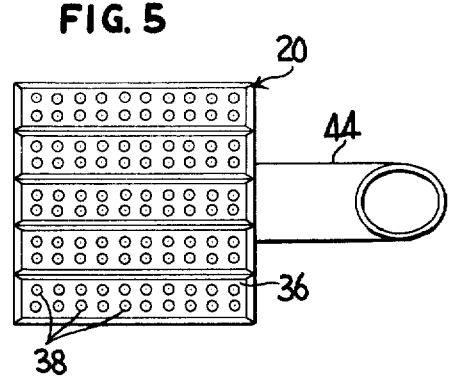
FIG. 5 is a bottom view of the bushing unit of FIG. 4.

Looking now at the drawings, we see in FIGS. 1 and 2, schematically, a melting tank 10 having a feeding end (not shown) into which batch materials are fed by conventional equipment and in which the batch materials are melted so as to form a supply of molten glass. Continuous introduction of batch material insures a continuous supply of molten glass which is delivered into a trough-like container 16 to form a pool of molten glass 18. Glass is delivered from the pool 18 to one or more bushing units 20 from which fibers 22 are drawn.

The trough-like container 16 is preferably constructed of an elongated insulating, refractory block 24 which forms the bottom and side walls thereof and is provided with a platinum or platinum-alloy liner 26 for glass contact. Contamination of the glass in the pool 18 is avoided by the choice of materials.

The container 16 is located within an enclosure 28 of refractory material of good insulative property, which enclosure is elongated and coextensive in length with the refractory block 24. The insulative refractory block 24 actually forms a portion of the bottom wall of the enclosure. The bottom of the enclosure 28 also includes elongated refractory members 30 extending the length thereof and being so shaped to support either bushing units 20 or refractory spacers 32 placed between adjacent bushing units. The members 30, bushing units 20, spacers 32, together with the bottom of the refractory block 24, thus form the bottom of the enclosure. Port openings 34 are located along the enclosure 28 to permit heat to be introduced therewithin. Such heat may be provided by gas burners of conventional design and construction and thus are not shown in detail. The enclosure 28 becomes a radiant unit, so that all parts therein are uniform in temperature.

Each of the bushing units 20 includes a bottom wall 36 provided with a plurality of tips 38 generally arranged in aligned rows, each tip having an orifice through which molten glass flows to be drawn and attenuated into fibers 22. There are provided side walls 40 and a top wall 42 to which is attached one end of a feed tube 44, referred to as a siphon tube. The walls of the bushing unit form a receptacle for molten glass supplied through the siphon tube 44, the other end of which is immersed in the pool of molten glass 18. The top wall 42 is preferably spaced from the bottom wall a distance of less than one inch, generally on the order of one-half or less and not more than one and one-half inches. This construction permits the radiant heat of the enclosure to be effective to maintain the uniformity of temperature of the glass within the bushing receiver because the top plate receives radiant energy from the massive heat within the enclosure. Each bushing unit is preferably constructed of platinum or a platinum-alloy, so as not to contaminate the glass, and is constructed so as to be received between and supported by the adjacent refractory members 30. However, steel, or other high temperature alloys may also be utilized.

When necessary suitable means, generally identified as 46, are provided beneath the bushing and between the rows of bushing tips to cool the glass flowing from the tips. Such means are usually referred to as "cone coolers" because of the cone shape assumed by the glass at the bushing tips. Any type of cone cooler can be used; for example, fins connected to a cooled header, or wires or troughs over which cooling water from a header is passed. Such cone coolers do not form a part of the invention described and claimed herein, so are only generally described.

Conventional drawing means including a gathering pad, a size applicator, a traversing means and a winding apparatus are used (but not shown in detail as they form no part of the invention) to draw the fibers which are grouped and wound as a strand.

However, because of the elimination of temperature compensating means to vary the temperature of the bushing as a forming package buildup in diameter (to maintain the fibers at substantially uniform diameter) and the uniformity in temperature of the glass as provided by the described inventive arrangement, the use of constant winding speed devices to insure a constant attenuation, and thus constant diameter fibers, is desirable. To use such a device, for example, that described and claimed in the copending application of Small and Drummond, Serial No. 176,734, filed March 1, 1962, constant speed mating pulling wheels 47 group and apply the attenuating force to the fibers which may be coated with a size and thereafter collected on a package 48 by the winding apparatus (indicated schematically and identified by the reference character 50).

To use the arrangement described, it is only necessary to locate a bushing unit in the desired location with its feed or siphon tube immersed within the glass in the pool 18. A suction head is placed against the bushing bottom to apply suction to the unit which draws molten glass into the siphon tube. Because the bushing is below the glass in the pool, the glass is siphoned from the pool to the bushing tips. As many bushing units may be used as space permits and the location of one bushing with respect to the others can be varied within the limits of the arrangement. In order to stop the flow of glass from a bushing, it is only necessary to remove the siphon tube from the pool of molten glass. To adapt the arrangement to the super-fine process requires a change in bushing tip size (i.e., a different bushing) and the addition of pulling, guide and blast equipment required in the process.

The arrangement, as a whole, as is readily seen, lends a degree of flexibility to the fiber forming process not heretofore obtainable. The use of the radiant enclosure eliminates costly bushing construction and electrical connections together with the controls required for operation. Moreover, the radiant enclosure assures a uniformity of temperature not heretofore attainable.

It is to be understood that other configurations of bushing units and radiant enclosures can be used without departing from the spirit of the invention. For example, a circular enclosure and circular bushing units could be used.

I claim:
1. In apparatus for producing glass fibers by attenuating streams of glass flowing through orifices in a bushing, the improvement which comprises:
   an enclosure having upper and bottom walls of a heat radiating material,
   said enclosure having an opening in the bottom wall thereof,
   a bushing unit mounted in and extending from said radiant heat enclosure into said opening to provide for the transfer of heat from said enclosure to said bushing unit,
   means for heating said heat radiating enclosure to maintain the interior thereof and its contents at a substantially uniform temperature,
   a container having an opening therein positioned in said enclosure and containing a pool of molten glass, and
   a heat conductive tube connected to said bushing unit and extending from a point beneath the surface of said molten glass through the opening in said container to said bushing unit, said tube being exposed both to said heating means and said heat radiating enclosure throughout the length thereof.
2. Apparatus as recited in claim 1 wherein a portion of said bushing unit includes said orifices and said portion is located at a level below the level of said container whereby said molten glass is siphoned from said container into said bushing unit.
3. Apparatus as recited in claim 2 wherein said bushing unit and said tube are removable from said enclosure and are replaceable by one or more bushing units and tubes.

References Cited by the Examiner
UNITED STATES PATENTS

| | | | |
|---|---|---|---|
| 2,053,381 | 9/1936 | Stewart | 65—126 |
| 2,482,299 | 9/1949 | Stevens | 65—1 |
| 2,830,000 | 4/1958 | Labino | 65—4 |

DONALL H. SYLVESTER, *Primary Examiner.*

S. LEON BASHORE, *Examiner.*

G. R. MYERS, *Assistant Examiner.*